May 9, 1933.  S. RUBEN  1,908,188
ELECTRIC CURRENT RECTIFIER
Filed Oct. 28, 1927
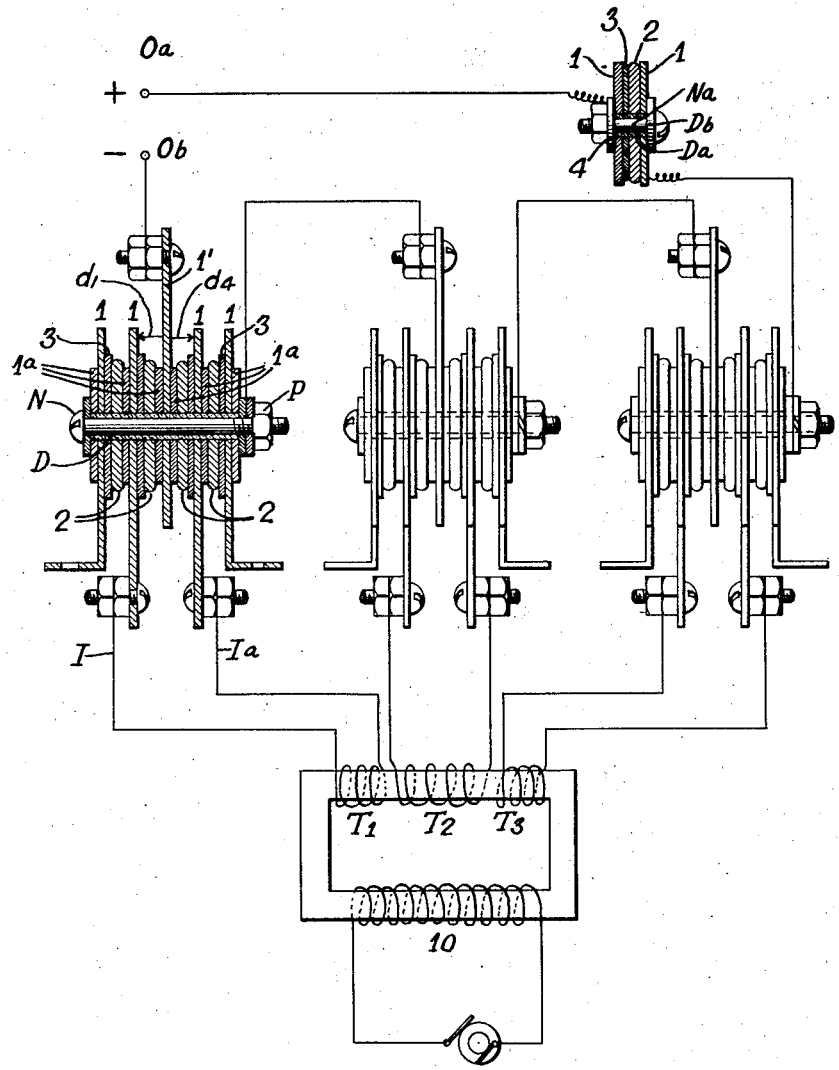
INVENTOR.
Samuel Ruben
BY
Mayer, Warfield & Watson
ATTORNEYS.

Patented May 9, 1933

1,908,188

UNITED STATES PATENT OFFICE

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE

ELECTRIC CURRENT RECTIFIER

Application filed October 28, 1927. Serial No. 229,362.

This invention relates to electric current rectifiers, particularly to an electrochemical rectifier of the dry contact-surface type, and to the method of making the same.

Rectifiers of this type are characterized by the use of a body of relatively electropositive material, employed as one electrode element, disposed in electrical contact with a body of relatively electronegative material employed as the other electrode element. Such rectifiers depend for their operation upon the resistance and current-blocking characteristics of the film which forms at the junction of the electrode elements as the result of electrochemical action. Rectifiers of this character, known prior to my invention, have been low in efficiency and limited in their application to small currents, becoming unstable after short periods of use.

Rectifiers of the above type are characterized by the use of an electrode of electropositive material such as aluminum connected in circuit with another electrode through an intermediate layer of a sulphur compound, and depend for their operation upon the presence of a current blocking or rectifying film on one of the electrodes. Such rectifiers heretofore available have been low in efficiency and limited in their use to small currents, becoming unstable after a short period of use.

The invention has for its object generally the provision of a method of making a rectifier of the dry surface contact variety which is free from the limitations mentioned above and is capable of use over relatively long periods of time and has a sustained current output.

Other objects of the invention will in part be obvious and will in part appear hereinafter.

This application is a continuation in part of my prior applications, Serial No. 739,188 filed September 22, 1924, now Patent 1,649,741, Serial No. 38,780 filed June 22, 1925, now Patent 1,723,525 Serial No. 51,524 filed August 20, 1925, now Patent 1,751,359 and Serial No. 69,215 filed November 16, 1925 now Patent 1,751,460.

The invention accordingly comprises the several steps and the relation and order of one or more of such steps with respect to each of the others thereof, which will be exemplified in the method hereinafter disclosed, and the scope of the application of which will be indicated in the claims.

For a fuller understanding of the nature and objects of the invention, reference should be had to the following detailed description taken in connection with the accompanying drawing, in which:

The figure is an exemplary view showing, mainly diagrammatically, a rectifying device constructed in accordance with the invention.

The rectifying device here shown is composed of a plurality of asymmetric electric couples, each consisting of a pair of electrode elements, which are mechanically retained between highly conducting elements, for example copper plates as shown at 1 and 1ª. These electrode elements are of relatively electropositive and electronegative materials and are shown at 2 and 3 respectively; 2 denoting a body of suitable electronegative material, for example a copper compound, such as cupric sulphide; 3 denoting a body of highly electropositive material, for example a relatively highly electropositive metal or metallic compound, such as aluminum, its amalgam, or a thinly coated oxide thereof. These elements are held in assembled relation by means of the insulated bolt N and nut P, the insulating tube shown at D serving to insulate the bolt from the electrode elements but does not insulate the bolt from the end plates. This bolt applies a relatively high pressure to the assembled couple, such pressure being in excess of that needed to withstand the dynamic effects of the electric field which obtains at the junction of the electrode elements.

For rectifying purposes, the asymmetric couples thus provided are formed into units comprising a series of couples. For full wave rectification these units as indicated preferably comprise two groups of series inverted with respect to each other, the groups containing an equal number of asymmetric couples. In this form of device the input terminals are with advantage inserted at intermediate points of each group, for example midway, as shown at I and I^a respectively. The end plates of the groups serve as suitable output terminals. The plate 1' between the two groups in each unit is shown in contact with electropositive elements 3 and is adapted to be connected to the negative terminal of a current-consuming device, here indicated at $O_b$.

A method preferred for assembling electrode elements of a rectifying couple which provides a proper layer between the electrode elements, consists in disposing adjacently the electropositive body and the electronegative body, placing a thin film of water therebetween, and then applying an alternating current at the normal operating potential to electrolytically decompose the water, causing the formation of an oxide upon the electrode surface. During the formation period mechanical pressure is maintained close to the limit of the compression strength of the weaker element, the pressure being increased according to the varying input current, which is indicative of the formation of the oxide coating. The pressure is increased only as the inverse and leakage current are indicated to be at a minimum. When the couple has been formed, only negligible current flows to it as no load is applied. At this stage, the couple is heated, preferably externally and an alternating current applied until all the excess water is driven off.

In certain devices of the prior art it was necessary to effect a sparking at the surface of the electrode elements by passing a current of high density across the junction of the electrode elements to effect formation. By the present invention such sparking is unnecessary and there is no physical consumption of the electrode material such as occurred in the methods employed in the prior art.

Asymmetric couples of the character provided by the present invention may have voltages continuously impressed thereacross up to a working maximum of approximately 5 volts. Current densities may be employed up to a working maximum of 1 ampere per square centimeter of contacting area. For higher voltages the couples would of course be connected in series. For voltage requiring a large number of couples the series arrangement is not practical, due to the uneven distribution of potential across the couples which results. The distribution of potential, though it be initially uniform, soon becomes more concentrated across one couple than another in the series, so that arcing occurs.

To apply current of potentials higher than a single rectifying unit is adapted to withstand, the arrangement illustrated in my prior application, Serial No. 38,780, is preferred. Accordingly a plurality of rectifying units is employed, so connected that their output terminals are in series and their input terminals connected with suitable independent sources of alternating current. This is accomplished preferably by the use of a transformer having a separate secondary for each separate rectifying unit to which it is connected. In the drawing there is accordingly shown a transformer 10, having its secondary divided into three parts, namely $T_1$, $T_2$ and $T_3$, which are respectively connected across the input terminals I and I^a of three series connected rectifying units.

In the drawing the output circuit shows a cut-out connected in series with the three rectifier units. The cut-out shown comprises contact plates 1, between which are disposed a cupric sulphide plate 2 and an aluminum plate 3 of the character indicated above. The elements are maintained under pressure by bolt $N_a$ insulated by dielectric tube $D_a$ and washer $D_b$ from the other elements except at conducting washer 4.

In operation, when alternating current is applied respectively across the input electrodes I and $I_a$, current flows in the output circuit only when the aluminum amalgam element is a cathode, i. e., in the direction indicated by arrows $d_1$ and $d_4$; direct current thereupon flowing through the series of rectifying devices, to the output circuit, and thence to the terminals $O_a$ and $O_b$. Upon a reversal of polarity on the input side, the direction of flow shown by the arrows $d_1$ and $d_4$ would be reversed, but since the output circuit is not completed for full wave rectification, no current would flow during the half-cycle for which this polarity obtains at the input terminals.

By the present invention the electronegative electrode element is a compound of a good electrical conductor with sulphur or a heavier component element from the sixth group in the periodic table of chemical elements, such component element being readily given up toward the electropositive electrode element, whereby the rectifying film, upon injury, is immediately and automatically repaired by the reaction electrochemically produced at the junction of the electrode elements.

The electronegative electrode element is here shown in the form of a disc having composition adapted to yield its electronegative component in this manner. Cupric sulphide (CuS) is an example of suitable material for use as the electronegative electrode element, since it was found that a highly efficient and stable rectifier for use under practical conditions requiring a wide margin of safety as to over-load, extended use, etc., cannot in general be produced with ordinary cuprous sulphide ($Cu_2S$) as the electronegative element but can readily be produced with cupric sulphide (CuS) particularly that produced by the method described below.

In order to produce electrode elements of cupric sulphide, which have such improved electrical characteristics, a preferred method involves first heating copper, in the form of metallic plate of a thickness preferably of about 5 millimeters, in an atmosphere of sulphur vapors from which oxygen has been excluded, under pressure greater than atmospheric pressure at a temperature above 150 degrees centigrade and below 800 degrees centigrade, preferably about 500 degrees centigrade. This pressure may be developed by the formation of sulphur vapors during the heating operation, or may be initially present through the introduction of sulphur vapors under a pressure greater than atmospheric pressure. Under this treatment substantially the entire copper plate becomes converted into a cupric sulphide body, taking the form of a hard dark blue to blackish, solid, metal-like material, having conducting and other electrical characteristics, such as a sufficiently low resistance which makes it much superior to cuprous sulphide (hemi-sulphide) or ordinary cupric sulphide otherwise produced. In the method above described the thickness of the initial copper plate and the temperature at which it is exposed to the sulphur vapor, are important factors in the procedure. A temperature above the minimum specified is found to be necessary to insure against the formation of cuprous sulphide ($Cu_2S$) in substantial amounts and thereby obtain relatively pure solid cupric sulphide ($CuS$).

The cupric sulphide electrode elements made as herein taught are reheated up to about the same temperature as that at which they are formed in air, which heating drives off much of the free sulphur, and are thereafter plunged into a chilling bath, preferably water, when a hardening and recrystallization takes place. Recrystallized cupric sulphide elements withstand the stresses of current discharge better than those not so treated.

Electronegative elements which are compounds of selenides or tellurides have particularly good reaction characteristics for film formation. To form these compounds, the temperatures at which the chemical reaction occurs must be higher than for sulphides. A slight admixture of sulphur, however, reduces the brittleness generally characteristic of such compounds. The preferred method of producing a composite sulphur-selenium compound for the electronegative electrode element consists in exposing one or more brass bodies in a non-oxidizing atmosphere in a reaction chamber containing a mixture of vapors of sulphur and selenium in substantially the proportions of 1:5 to 6 parts by weight; the reaction chamber being heated to a temperature substantially in the neighborhood of 800° C.

After the electronegative bodies have thus been produced and cooled, and before assembly or machining, they are with advantage again relatively highly heated in the reacting chamber atmosphere and cooled, as by so doing occluded gases remaining in the compound from the reacting chamber are driven off with consequent improvement in the rectifying characteristics of the resulting asymmetric couple.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure as Letters Patent is:

1. The method of producing an electrode of cupric sulphide, for dry surface contact rectifying devices and the like, which consists in subjecting a plate of metallic copper to a temperature above 150 degrees centigrade in an atmosphere of sulphur vapors from which oxygen is excluded and under substantial pressure.

2. The method of producing an electrode for dry surface-contact current rectifiers and the like, which comprises subjecting a copper body in an atmosphere of sulphur vapor under pressure to a temperature not exceeding 800 degrees C., to produce a cupric sulphide body, and thereafter subjecting said cupric sulphide body to a like temperature in air and immersing it in a liquid of relatively low temperature.

3. The method of producing an electronegative electrode for dry surface rectifying devices and the like, which comprises subjecting a body containing copper to an atmosphere containing a vapor of an element of the sixth periodic group of chemical elements from which vapor oxygen has been excluded, and then heating said body to a temperature between limits of 150 degrees C. and 800 degrees C. while under pressure to form a maximum valent compound.

4. The method of producing an electronegative electrode for dry surface rectifying devices and the like, which comprises subjecting a body containing copper to an atmosphere containing a vapor of an element of the sixth periodic group of chemical elements from which vapor oxygen has been excluded, then heating said body to a temperature between limits of 150 degrees C. and 800 degrees C, while under pressure to form a maximum valent compound, and reheating the same to drive off any uncombined element of the sixth periodic group.

5. The method of producing an electronegative electrode element for dry surface contact rectifying devices and the like, which comprises subjecting a body containing copper to an atmosphere containing a vapor of an element beginning with the letter S from the sixth periodic group of chemical elements from which oxygen has been excluded, and heating said body to a temperature not exceeding substantially 800 degrees C. while under pressure to form a maximum valent compound.

6. The method of producing an electronegative electrode element for dry surface contact rectifying devices and the like, which comprises subjecting a body containing copper to an atmosphere containing a vapor of an element beginning with the letter S from the sixth periodic group of chemical elements from which oxygen has been excluded, heating said body to a temperature not exceeding substantially 800 degrees C. while under pressure to form a maximum valent compound, and reheating said body in an atmosphere of air to approximately the same temperature.

7. The method of producing an electronegative electrode element for dry surface contact rectifying devices and the like, which comprises subjecting a body containing copper to an atmosphere containing a vapor of an element beginning with the letter S from the sixth periodic group of chemical elements from which oxygen has been excluded, heating said body to a temperature not exceeding substantially 800 degrees C. while under pressure to form a maximum valent compound, reheating said body in an atmosphere of air to approximately the same temperature, and recrystallizing said body after said reheating.

8. The method of producing an electronegative electrode for dry surface contact rectifying devices and the like, which comprises subjecting a body containing copper to an atmosphere containing vapors of sulphur from which oxygen has been excluded, heating said body while so exposed to a temperature not exceeding 800 degrees C. while under pressure, and continuing said treatment until a hard, dark blue to blackish compound appears at the surface of the resultant body.

9. The method of producing an electronegative electrode for dry surface contact rectifying devices and the like, which comprises subjecting a body containing copper to an atmosphere containing vapors of sulphur from which oxygen has been excluded, heating said body while so exposed to a temperature not exceeding 800 degrees C. while under pressure, continuing said treatment until a hard, dark blue to blackish compound appears at the surface of the resultant body, and reheating the same in an atmosphere of air to substantially the same temperature.

10. The method of producing an electronegative electrode for dry surface contact rectifying devices and the like, which comprises subjecting a body containing copper to an atmosphere containing vapors of sulphur from which oxygen has been excluded, heating said body while so exposed to a temperature not exceeding 800 degrees C. while under pressure, continuing said treatment until a hard, dark blue to blackish compound appears at the surface of the resultant body, reheating the same in an atmosphere of air to substantially the same temperature, and recrystallizing the reheated body by quenching.

In testimony whereof I affix my signature.

SAMUEL RUBEN.